United States Patent
Sasaki et al.

(10) Patent No.: US 7,742,835 B2
(45) Date of Patent: Jun. 22, 2010

(54) PROFILE CONTROL METHOD AND SYSTEM THEREFOR

(75) Inventors: Takashi Sasaki, Musashino (JP); Akimichi Noyori, Tokyo (JP); Akihiro Yamamoto, Sizuoka (JP)

(73) Assignee: Yokogawa Electric Corporation, Tokyo (JP)

( * ) Notice: Subject to any disclaimer, the term of this patent is extended or adjusted under 35 U.S.C. 154(b) by 546 days.

(21) Appl. No.: 11/730,180

(22) Filed: Mar. 29, 2007

(65) Prior Publication Data

US 2007/0233307 A1 Oct. 4, 2007

(30) Foreign Application Priority Data

Mar. 30, 2006 (JP) ............................. 2006-092756

(51) Int. Cl.
 *G06F 19/00* (2006.01)
(52) U.S. Cl. .................... 700/129; 700/128; 162/262
(58) Field of Classification Search ................ 700/127, 700/128, 129; 162/198, 238, 252, 262, 263
See application file for complete search history.

(56) References Cited

U.S. PATENT DOCUMENTS

| 5,400,258 | A | * | 3/1995 | He .............................. 700/129 |
| 5,805,453 | A | * | 9/1998 | Sasaki ......................... 700/128 |
| 6,080,691 | A | * | 6/2000 | Lindsay et al. .............. 162/383 |
| 6,461,474 | B1 | * | 10/2002 | Lindsay et al. .............. 162/109 |
| 7,128,808 | B2 | * | 10/2006 | Metsala et al. .............. 700/129 |

FOREIGN PATENT DOCUMENTS

| JP | 02-139488 A | 5/1990 |
| JP | 2005-186377 A | 7/2005 |

OTHER PUBLICATIONS

Sasaki, et al., "Optimizing Control of Basis Weight Profile in Paper Machines Based on Virtual Slice-bolt Position," Kagaku Kogaku Ronbunshu, vol. 25, No. 6, 1999, pp. 947-954.

* cited by examiner

*Primary Examiner*—Charles R Kasenge
(74) *Attorney, Agent, or Firm*—Sughrue Mion, PLLC

(57) ABSTRACT

A profile control method for controlling a profile in the width direction of a sheet by using a plurality of actuators, includes calculating an envelope profile connecting local peaks of the profile; and calculating a manipulated value of each actuator with the objective of optimizing $2\sigma$ of the profile and the envelope profile.

4 Claims, 6 Drawing Sheets

PROFILE CONTROL METHOD AND SYSTEM THEREFOR

BACKGROUND OF THE INVENTION

1. Field of the Invention

The present invention relates to a profile control method for a sheet-manufacturing process of paper, films, and the like (hereinafter, collectively referred to as sheet) and the system thereof.

Priority is claimed on Japanese Patent Application No. 2006-092756, filed Mar. 30, 2006, the content of which is incorporated herein by reference.

2. Description of the Related Art

In a sheet manufacturing process of paper, films, and the like, to make the quality of sheets in the width direction uniform is the most important factor in characterizing the product quality. For example, T. Sasaki, M. Matsuda, S. Yamamoto, and I. Hashimoto, "Optimizing Control of Basis Weight Profile in Paper Machines based on Virtual Slice-bolt Position," KAGAKU KOGAKU RONBUNSHU, Vol. 25, No. 6, 1999, pp. 947-954, and Japanese Published Unexamined Patent Application, First Publication No. (JP-A) H2-139488 have disclosed a technology, in which in sheet-making paper by using a paper machine, paper is measured for the basis weight (the weight of paper in grams per square meter: g/m$^2$), while the paper is scanned in the width direction, thereby optimizing the variation (2σ) of deviations with respect to the mean value of basis weight to make the basis weight uniform in the width direction of the paper. Hereinafter, a specific description will be given for the technology.

In this instance, a plurality of basis weight data (t pieces) between one-way scans in the width direction of paper is given as RV(i) (i=1, 2, . . . , t), and a set of data based on deviations between the mean value $RV_{AV}$ of the basis weight data concerned RV(i) and each of the basis weight data RV(i) are called basis weight raw profile. Where the basis weight raw profile is given as R(i), it is expressed as R(i)=RV(i)−$RV_{AV}$ (i=1, 2, . . . , t). Further, of a plurality of actuators (N units), the above basis weight raw profile changes on operation of the k$^{th}$ actuator. In this instance, the number of basis weight data RV(i) corresponding to the center of a change in profile is called a k$^{th}$ actuator position correspondence, which is given as SPT(k). In other words, SPT(k) is an integer value from 1 to t.

Further, virtual actuators (the total number N−1 unit) are defined at an intermediate position of adjacent actuators, and the number of basis weight data RV(i) corresponding to the center of the change in profile due to operation of the virtual actuator is called a virtual actuator position correspondence, which is given as SP(i) (i=1, 2, . . . , 2N−1). In this instance, basis weight raw profiles are averaged with respect to the position of an actually available actuator and that of a virtually defined actuator, thereby defining a virtual actuator corresponding profile P(i) which is expressed by the formula (1) given below.

$$P(i) = \frac{1}{MPT} \sum_{j=-h}^{+h} R(SP(i) + j) \ (i = 1, \ldots, 2*N - 1) \quad (1)$$

where, $MPT$ = a first odd number of no less than $\frac{t}{2N-1}$ $h = \frac{MPT - 1}{2}$ In the above formula (1), the virtual actuator position correspondence SP(i) is expressed by the following formulae (2) and (3). In other words, an odd-numbered virtual actuator position correspondence is equal to a k$^{th}$ actuator position correspondence, whereas an even-numbered virtual actuator position correspondence is obtained by rounding the mean value of the k$^{th}$ actuator position correspondence of an adjacent actuator to obtain an integer number.

$$SP(2k-1) = SPT(k) \quad (2)$$

$$SP(2k) = int\left(\frac{SPT(k) + SPT(k+1)}{2}\right) \quad (3)$$

k=1, . . . , and N (N: the number of actuators)

As shown in the above formula (1), the virtual actuator corresponding profile P(i) is a profile consisting of points which is two times the total number of actuators (N) minus 1 (i.e., N×2−1), which is obtained by averaging basis weight raw profiles with respect to the position of an actually available actuator and that of a virtually defined actuator. Each of the actuators is controlled, with the objective of optimizing mountain/valley portions of the above-described virtual actuator corresponding profile P(i), that is, variation (2σ) of deviations with respect to mean values, thereby making it possible to make the basis weight uniform in the width direction of paper.

In this instance, the manipulated value of each of the actuators is given as X(j) (j=1, 2, . . . , N). In general, where each of the actuators arranged in the width direction is operated, a profile is changed not only at a position corresponding to the thus operated actuator but also in the vicinity thereof. This phenomenon is called a width-direction process interference. Where a variation of an i$^{th}$ virtual actuator corresponding profile P(i) with respect to the above-described manipulated value X(j) is given as W(i,j) and a matrix expressing the width-direction process interference (process interference matrix) is defined as W={W(i,j)}, a matrix P of the virtual actuator corresponding profile is expressed by the formula (4) shown below.

$$P = X \cdot {}^tW + P_0 \ ({}^tW \text{ is a transposed matrix of } W) \quad (4)$$

where,

P=(P(1),P(2), . . . , P(2·N−1)): Virtual actuator corresponding profile $P_0$=($P_0$(1), $P_0$(2), . . . , $P_0$(2·N−1)): Initial value of the virtual actuator corresponding profile X=(X(1),X(2), . . . ,X(N)): Manipulated value $$W = \begin{bmatrix} W(1,1) & W(1,2) & \ldots & W(1,N) \\ W(2,1) & & & \\ \vdots & & & \\ W(2 \cdot N - 1, 1) & \ldots & & W(2 \cdot N - 1, N) \end{bmatrix}$$

Process interference matrix

Further, the virtual actuator corresponding profile P(i) expresses at all times a deviation with respect to a mean value. Thus, assuming that the mean value of the virtual actuator corresponding profile P(i) is zero, an evaluation function E(X) indicating a variation of the deviation with respect to the above mean value is expressed by the formula (5) given below. Further, a gradient ∇E(X) of the evaluation function E(X) is expressed by the formula (6) given below.

$$E(X) = \sum_{i=1}^{2 \cdot N - 1} P(i)^2 \qquad (5)$$

$$= P \cdot {}^t P$$

$$= (X^t W + P_0) \cdot {}^t (X^t W + P_0)$$

$$= X^t W \cdot W^t X + P_0 W^t X + X^t W^t P_0 + P_0{}^t P_0$$

Assuming $$\nabla E(X) = \left( \frac{\partial E(X)}{\partial X(1)}, \frac{\partial E(X)}{\partial X(2)}, \ldots, \frac{\partial E(X)}{\partial X(N)} \right),$$

The following is obtained.

$$\nabla E(X) = 2 X^t W \cdot W + 2 P_0 W \qquad (6)$$

$$= 2(P - P_0) \cdot W + 2 P_0 W$$

$$= 2 P \cdot W$$

In this instance, the changed manipulated value $\Delta X$ for making the evaluation function $E(X)$ small most rapidly (in other words, minimizing the variation of deviations in the virtual actuator corresponding profile) is expressed based on the steepest descent method by using a sufficiently small positive value E to give the formula (7), which is also expressed in a scalar form as the formula (8) shown below.

$$\Delta X = -\frac{\varepsilon}{2} \cdot \nabla E(X) = -\varepsilon \cdot P \cdot W \qquad (7)$$

$$\Delta X(j) = -\varepsilon \cdot \sum_{i=1}^{2 \cdot N - 1} P(i) \cdot W(i, j) \, (j = 1, \ldots, N) \qquad (8)$$

In other words, based on a plurality of basis weight data between one-way scans, a virtual actuator corresponding profile P(i) is calculated from the above formula (1), and the changed manipulated value $\Delta X$ of each actuator is also calculated from the above formula (8), thereby the changed manipulated value $\Delta X$ is used to control each of the actuators. It is, therefore, possible to make the basis weight uniform in the width direction of paper. Further, the technology disclosed in Sasaki et al. and JP-A 02-139488 is applicable as a profile control not only to paper but also to other sheets such as films in the manufacturing process.

Further, Japanese Published Unexamined Patent Application, First Publication No. (JP-A) 2005-186377 has disclosed a film-thickness control method for providing a preferable film winding shape by uniformizing local projections made on a thickness profile in the width direction of film in manufacturing processes. According to this film-thickness control method, first, a film pushed out from a slit-shaped film discharge port mounted on a T die is measured for thickness, while the film is scanned in the width direction, thereby obtaining a thickness profile indicating the variation of deviations with respect to the mean value of the thickness. Then, a first correction control value is determined so that the variation of the thickness profile will fall within a permissible range of use, and a second correction control value is determined so that projections of the thickness profile will fall within the permissible range of use. On the basis of the first correction control value and the second correction control value, the clearance of the film discharge port on the T die is controlled. More specifically, a plurality of adjusting bolts having the same function as the actuator in the above-described paper machine are arranged along a lip portion of the film discharge port. Each of the adjusting bolts is controlled for a vertical movement based on the first correction control value and the second correction control value, by which load applied to the lip portion is adjusted to control the clearance of the film discharge port and uniformize the film thickness.

Incidentally, according to the technology disclosed in the above Sasaki et al. and JP-A 02-139488, it is possible to uniformize a profile for the width direction of sheets by defining a virtual actuator corresponding profile P(i) and controlling each actuator with the objective of optimizing the variation (2σ) mainly based on the mean value of the profile concerned. However, the following problems exist regarding the quality of an entire roll finally wound up.

In processes of manufacturing a plastic film, in particular, a greater importance is placed on a preferable film winding shape after being wound up to a roll, rather than on the variation of thickness profiles in the width direction of film. For example, where there are at all times projections greater than those in the vicinity at the same place of a thickness profile, the projections come to the surface as lumps on winding up the film to the roll, thus resulting in the deteriorated quality of the film winding shape in the roll. According to the technology disclosed in Sasaki et al. and JP-A 02-139488, there are some cases where the above-described projections which are greater than those in the vicinity may remain on the film.

On the other hand, according to the technology disclosed in JP-A 2005-186377, after a first correction control value is determined, a thickness profile variation is estimated by referring to a model, and a second correction control value is also determined for making the projections uniform in height. This method requires a greater calculation amount to result in an increased processing load on a calculating unit, which is problematic.

Further, where there is an unexpectedly great difference between the thickness profile variation calculated by referring to the model and an actual thickness profile variation due to disturbance, another problem is posed that a sufficient control performance is not maintained.

SUMMARY OF THE INVENTION

The present invention has been made in view of these problems, an object of which is to suppress processing load on the profile control in the width direction of a sheet and also provide a preferable sheet winding shape without an influence of disturbance.

In order to solve the above problems, the present invention provides a method for controlling a profile in the width direction of a sheet by using a plurality of actuators, including calculating an envelope profile connecting local peaks of the profile; and calculating a manipulated value of each actuator with the objective of optimizing 2σ of the profile and the envelope profile.

Further, the profile control method according to the present invention may further include applying the steepest descent method relating to an evaluation function of optimizing 2σ of the profile and the envelope profile.

Further, in the profile control method according to the present invention, the evaluation function may be obtained by adding an evaluation function of the envelope profile containing a predetermined weighting factor to the evaluation function of the profile, and an optimization ratio of the profile to the envelope profile may be adjusted by adjusting the weighting factor.

Furthermore, the present invention provides a system for controlling a profile in the width direction of a sheet by using a plurality of actuators as a first solution of the profile control system, including a profile controller by using a profile measured while scanning for the width direction of the sheet to calculate an envelope profile connecting local peaks of the profile, thereby calculating a manipulated value of each actuator with the objective of optimizing 2σ of the profile and the envelope profile.

According to the present invention, it is possible to suppress a processing load on profile control in the width direction of a sheet and also provide a preferable sheet winding shape without an influence of disturbance.

DETAILED DESCRIPTION OF THE INVENTION

Figure 1:
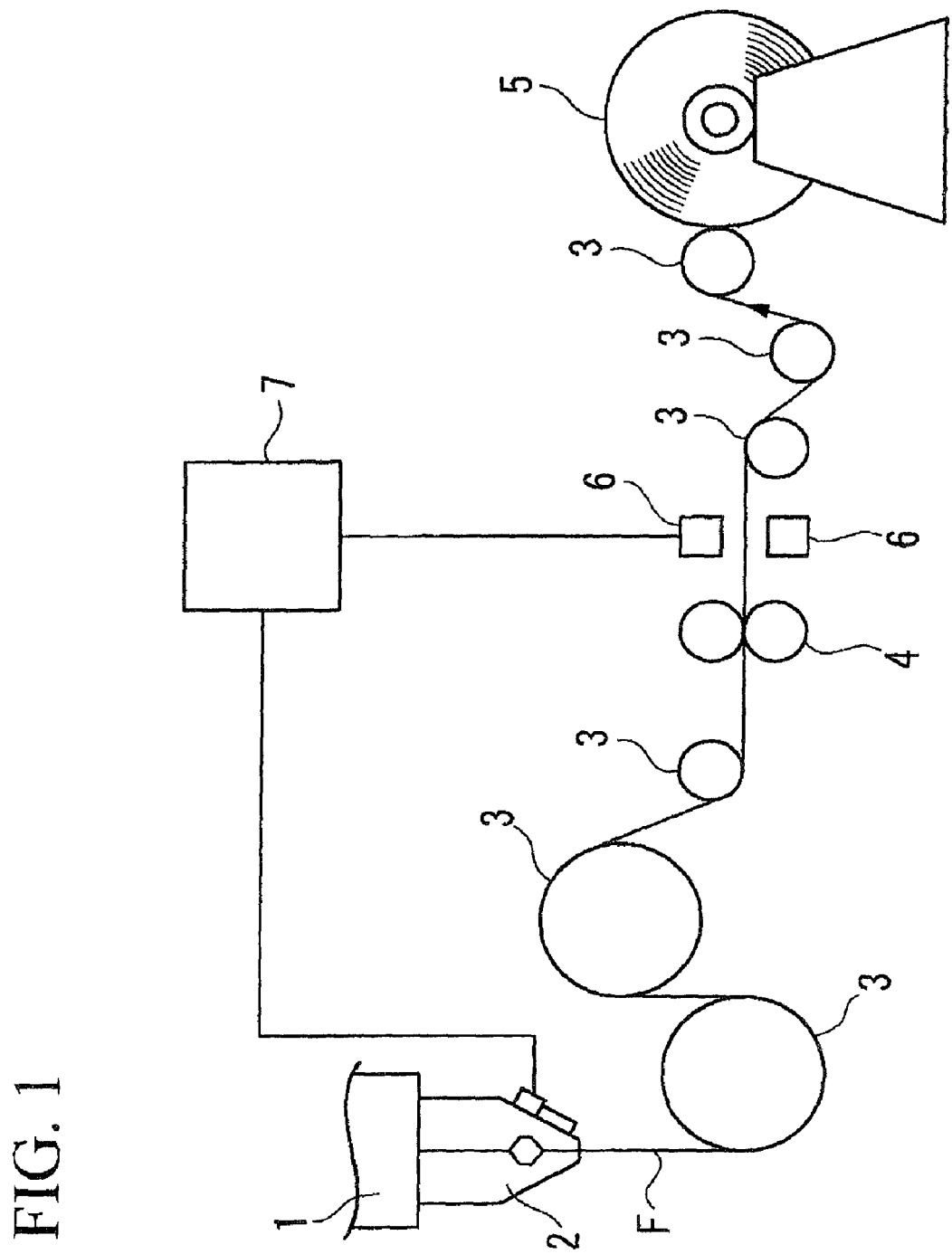
FIG. 1 is a schematic diagram illustrating a film forming system including a profile control system in one embodiment of the present invention.

Hereinafter, a description will be given of one embodiment in the present invention by referring to the drawings. FIG. 1 is a schematic diagram illustrating a film forming system including a profile control system in the present embodiment. Hereinafter, a description will be given of a film forming system used in processes of manufacturing films such as plastic films in a sheet form.

Figure 2:
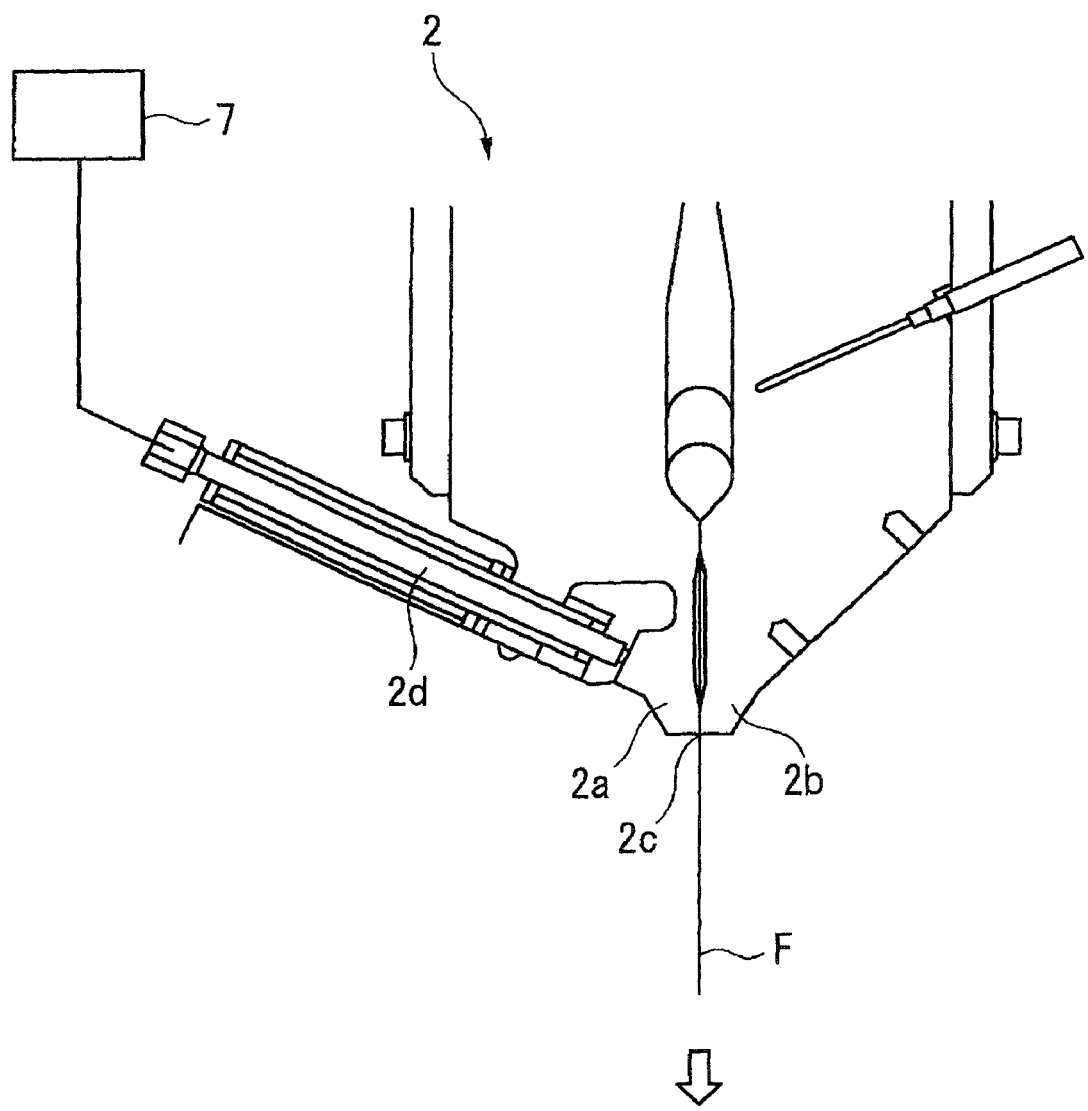
FIG. 2 is a detailed view illustrating a T die 2 of the film forming system in one embodiment of the present invention.

As illustrated in FIG. 1, a film forming system used in the present embodiment comprises an extruder 1, a T die 2, a guide roll 3, a processing roll 4, a winding roll 5, a thickness gauge 6, and an adjusting bolt control portion (actuator controller) 7. The extruder 1 is to accommodate melted resin of film F and also supply (extrude) the melted resin after application of pressure thereto. As illustrated in FIG. 2, the T die 2 includes a slit-shaped film discharge port 2c between lips 2a and 2b. The melted resin extruded from the extruder 1 is formed into a sheet shape via the film discharge port 2c and wound up continuously through the guide roll 3 and the processing roll 4 by the winding roll 5 as the film F.

Further, as illustrated in FIG. 2, the lip 2a of the T die 2 includes a plurality of adjusting bolts 2d (actuator) (N units), which can be moved vertically, at predetermined intervals for the width direction of the film F. These adjusting bolts 2d are moved vertically in response to an operational signal input from an adjusting bolt control portion 7, and the vertical movement also allows the load applied to the lip 2a to change, thus resulting in change in clearance of the film discharge port 2c. In other words, the film F is controlled for thickness in the width direction by controlling the vertical movement of each of the adjusting bolts 2d. The adjusting bolts 2d used here are those such as heat bolts functioning based on thermal displacement.

The thickness gauge 6 is provided so as to move in a reciprocating manner, with the width direction of the film F given as a scanning direction, measuring the thickness based on the attenuation rate of radioactive rays radiated to the film F, outputting a thickness measurement signal indicating the thickness to the adjusting bolt control portion 7. The adjusting bolt control portion 7 performs a predetermined calculation based on the thickness measurement signal input from the thickness gauge 6, thereby calculating the manipulated value of the individual adjusting bolts 2d, outputting operational signals indicating the manipulated value to these adjusting bolts 2d to control the vertical movement of each of these adjusting bolts 2d. Further, of the above-described constituents, the thickness gauge 6 and the adjusting bolt control portion 7 are to constitute a profile control system of the present invention.

Next, a description will be given of actions of controlling a thickness profile for the width direction of the film F by the thus constituted film forming system.

Figure 3:
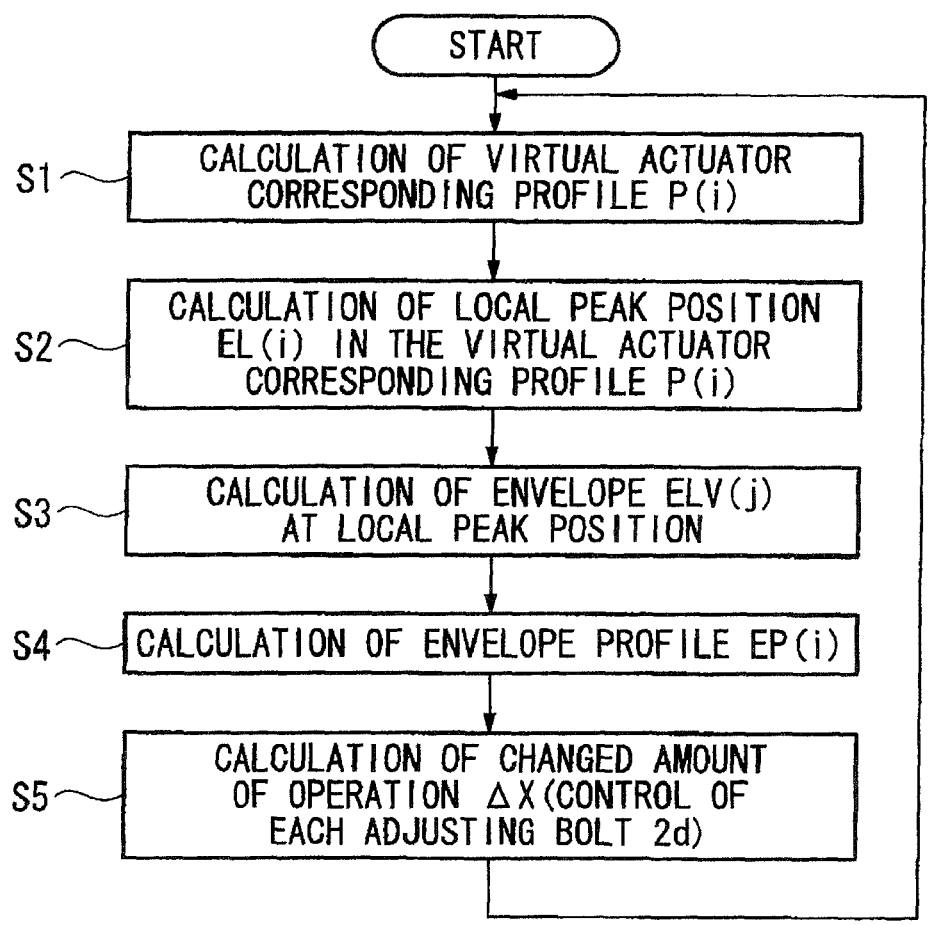
FIG. 3 is a flowchart illustrating actions of the film forming system including a profile control system in one embodiment of the present invention.

In a process of manufacturing plastic films, if an air layer is allowed between films on winding them up to a winding roll 5, valleys of a thickness profile (recesses) will hardly influence the quality of a film winding shape in a roll. Therefore, in order to obtain a preferable film winding shape having a smaller number of lumps, the thickness can be controlled so as to make projections uniform in height (to remove projections markedly higher than those in the vicinity) even where irregularities are found in the thickness profile. As described above, the idea that projections on a thickness profile are made uniform is similar to that given in JP-A 2005-186377, but a method for realizing the idea is entirely different, which will be described as follows. In the present embodiment, an envelope profile connecting local peaks of the thickness profile (virtual actuator corresponding profile) is obtained, thereby calculating the manipulated value of individual adjusting bolts 2d with the objective of optimizing the variation (2σ) of the envelope profile. Hereinafter, a detailed description will be given by referring to the flowchart of actions in FIG. 3.

The thickness gauge 6 moves in a reciprocating manner, while scanning for the width direction of film F to be finally wound up to a winding roll 5, continuously measuring the thickness in the width direction of the film F, and outputting a thickness measurement signal to the adjusting bolt control portion 7. The adjusting bolt control portion 7 will average partially thickness measurement signals (that is, measured values of thickness) continuously obtained by every one-way scan at equal intervals, for example, 1 mm apart from each other, thereby forming a plurality of thickness data (t pieces) between one-way scans. In this instance, if the thickness data is given as RV(i) (i=1, 2, . . . , t), as with the conventional technology, a virtual actuator corresponding profile P(i) can be calculated based on the above formula (1). In other words, the adjusting bolt control portion 7 uses this thickness data RV(i) to calculate the virtual actuator corresponding profile P(i) based on the above formula (1) (step S1). A method for calculating the virtual actuator corresponding profile P(i) is the same as that given in the conventional technology, the description of which will be omitted here.

The adjusting bolt control portion 7 then calculates a local peak position EL(i) (i=1, 2, . . . 2N−1) of the above-calculated virtual actuator corresponding profile P(i) (step S2). In this instance, the local peak position EL(i) is a virtual actuator number giving local peaks (projections) at the virtual actuator corresponding profile P(i). In other words, the local peak position EL(i) is obtained when virtual actuator numbers satisfying: P{EL(i)−1}<P{EL(i)} and P{EL(i)}>P{EL(i)+1} are arrayed in ascending order. However, where a maximum i meeting the above condition is given as i=NA, an i which satisfies the condition of NA<i≦2N−1 is defined as EL(i)=0. Therefore, 1≦EL(1)<EL(2)< . . . <EL(NA) is obtained to give EL(NA+1)=EL(NA+2)=. . . =EL(2N−1)=0.

The adjusting bolt control portion 7 then calculates an envelope ELV(j) (j=1, 2, . . . 2N−1) with regard to a virtual actuator corresponding profile P{EL(i)}(i=1, 2, . . . NA) at the local peak position EL(i) (step S3). In this instance, the ELV (j) is expressed by the following formulae (9) to (11), depending on the value of j.

$$\text{For } 1 \leq j \leq EL(1), ELV(j) = P(j) \tag{9}$$

$$\text{For } EL(i) \leq j \leq EL(i+1), \tag{10}$$
$$ELV(j) = P(EL(i)) + \frac{P(EL(i+1)) - P(EL(i))}{EL(i+1) - EL(i)} \times (j - EL(i))$$

$$\text{For } EL(NA) \leq j \leq 2 \times N - 1, ELV(j) = P(i) \tag{11}$$

Then, the adjusting bolt control portion 7 uses the above-calculated envelope ELV(j) to calculate an envelope profile EP(i) (i=1, 2, . . . 2N−1) based on the formula (12) given below (step S4). In other words, a set of data obtained based on deviations between the mean value of envelopes ELV(j) and each ELV(j) is the envelope profile EP(i).

$$EP(i) = ELV(i) - ELVAVE (i = 1, 2, \ldots, 2N-1) \tag{12}$$

where ELVAVE is the mean value of ELV(i).

Figure 4:
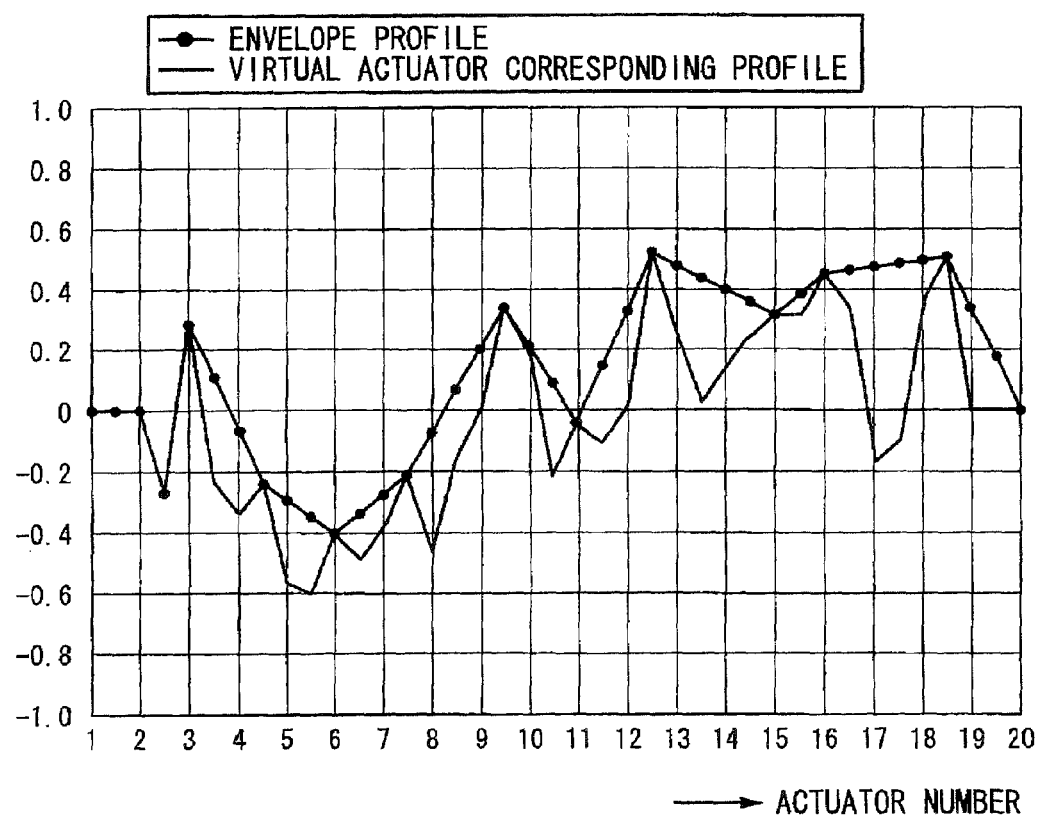
FIG. 4 illustrates one example of a virtual actuator corresponding profile P(i) and an envelope profile EP(i) in one embodiment of the present invention.

FIG. 4 illustrates an envelope profile EP(i) relating to a virtual actuator corresponding profile P(i), where the total number of actuators N (adjusting bolts 2d) is twenty. In the conventional technology (Sasaki et al. and JP-A 02-139488), the virtual actuator corresponding profile P(i) is controlled so as to be made uniform as much as possible, or so as to give P(i)=0. In the present embodiment, however, each of adjusting bolts 2d is controlled so as to make both of the virtual actuator corresponding profile P(i) and the envelope profile EP(i) uniform, or so as to give P(i)=0 and EP(i)=0. Therefore, making the envelope profile EP(i) uniform is making local peaks uniform in height, which eventually satisfies the conditions of a preferable winding shape in a roll, that is, recesses are found but projections are uniform in height, and there are no projections particularly higher than those in the vicinity.

In this instance, where amounts of operation of individual adjusting bolts 2d are given as X(j) (j=1, 2, . . . , N), a variation of the $i^{th}$ virtual actuator corresponding profile P(i) for the manipulated value X(j) concerned is given as W(i,j) and a matrix indicating the width-direction process interference (process interference matrix) is defined as W={W(i,j)}, a matrix P of the virtual actuator corresponding profile is expressed by the above formula (4). On the other hand, where the width-direction process interference is similarly taken into account for the envelope profile EP(i), the matrix P of the envelope profile is expressed by the formula (13) given below.

$$EP = \overline{X} \cdot {}^t W + P_0 \tag{13}$$

Further, a virtual actuator corresponding profile P(i) and an envelope profile EP(i) express at all times deviations with respect to mean values. Therefore, assuming that the mean values of the virtual actuator corresponding profile P(i) and the envelope profile EP(i) are zero, an evaluation function $E_1(X)$ indicating the variation of deviations with respect to these mean values is expressed by the formula (14) given below. In the formula (14), a constant number α (α≧0) is a weighting factor deciding the weight of the envelope profile EP(i) in the evaluation function $E_1(X)$. Further, the gradient $\nabla E_1(X)$ of the evaluation function $E_1(X)$ is expressed by the formula (15) given below.

$$E_1(X) = \sum_{i=1}^{2 \cdot N-1} P(i)^2 + \alpha \sum_{i=1}^{2 \cdot N-1} EP(i)^2 \tag{14}$$
$$= P \cdot {}^t P + \alpha \cdot EP \cdot {}^t EP$$
$$= (X \cdot {}^t W + P_0) \cdot {}^t (X \cdot {}^t W + P_0) +$$
$$\alpha(\overline{X} \cdot {}^t W + P_0) \cdot {}^t (\overline{X} \cdot {}^t W + P_0)$$

$$\nabla E_1(X) = 2X \cdot {}^t W \cdot W + 2P_0 \cdot W + \alpha(2\overline{X} \cdot {}^t W \cdot W + 2P_0 \cdot W) \tag{15}$$
$$= 2(X \cdot {}^t W + P_0) \cdot W + 2\alpha \cdot (\overline{X} \cdot {}^t W + P_0) \cdot W$$
$$= 2(P + \alpha \cdot EP) \cdot W$$

In this instance, the changed manipulated value ΔX for making the evaluation function $E_1(X)$ small most rapidly is expressed by the formula (16) by using a sufficiently small integer ε based on the steepest descent method. If the formula (16) is expressed in a scalar form, it is expressed by the formula (17) shown below. As apparent from the formula (17), comparison with the method (8) for calculating the changed manipulated value ΔX in the conventional technology reveals that the method for calculating the changed manipulated value ΔX in the present embodiment is obtained by adding an envelope profile EP(i) with which a weighting factor a is multiplied to a virtual actuator corresponding profile P(i). In other words, a ratio of the optimized virtual actuator corresponding profile P(i) to the optimized envelope profile EP(i) can be adjusted by adjusting the weighting factor α.

$$\Delta X = -\frac{\varepsilon}{2} \cdot \nabla E_1(X) = -\varepsilon \cdot (P + \alpha \cdot EP) \cdot W \tag{16}$$

$$\Delta X(j) = -\varepsilon \cdot \sum_{i=1}^{2 \cdot N-1} (P(i) + \alpha \cdot EP(i)) \cdot W(i, j) \, (j = 1, \ldots, N) \tag{17}$$

The adjusting bolt control portion 7 calculates the changed manipulated value ΔX of each of the adjusting bolts 2d based on the above formula (17), outputting an operational signal indicating the changed manipulated value ΔX to each of the adjusting bolts 2d, thereby controlling the vertical movement of each of the adjusting bolts 2d (step S5). Further, actions from the above-described steps Step 1 to Step 5 will be repeated for the width direction of film F based on thickness data for every one-way scan.

Figure 5:
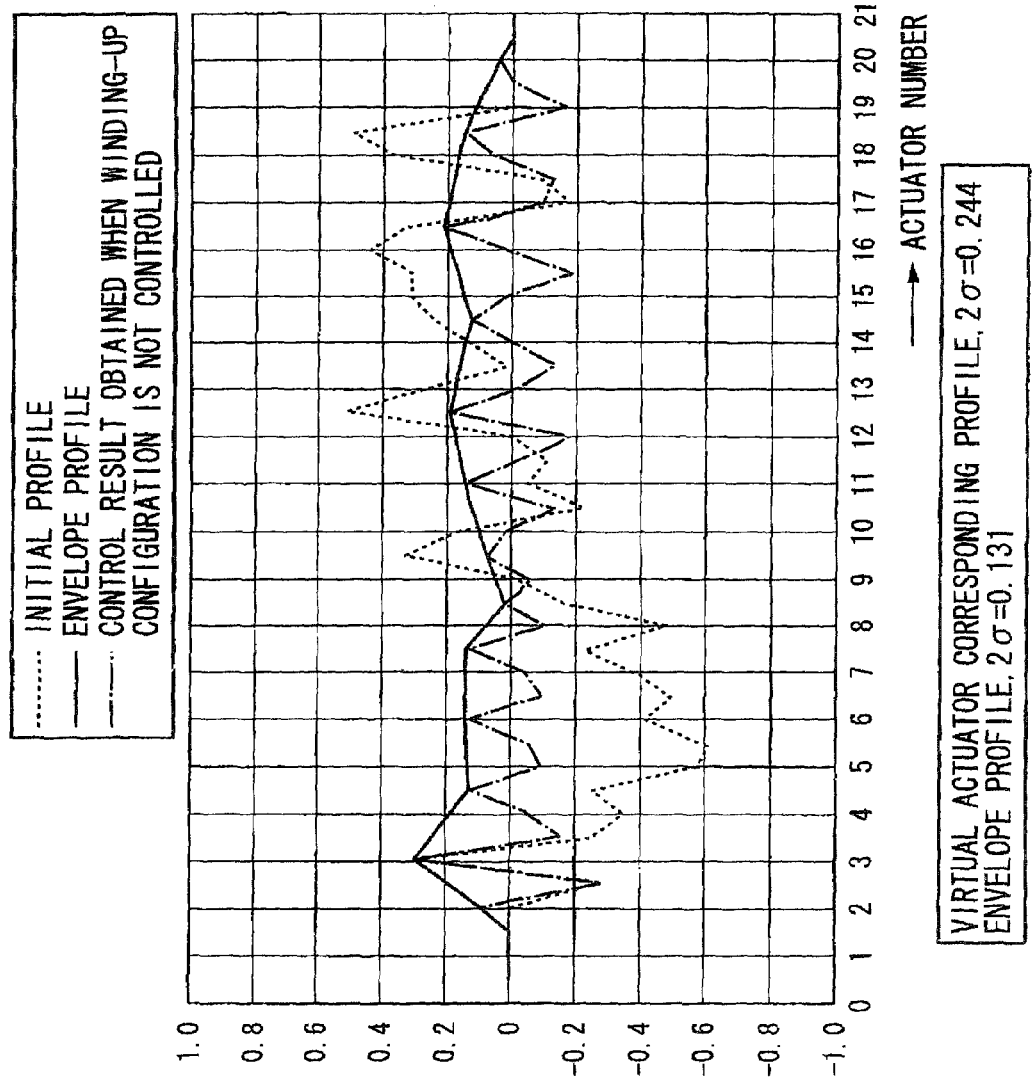
FIG. 5 illustrates the result of a simulation where the profile control in one embodiment of the present invention is not carried out.
Figure 6:
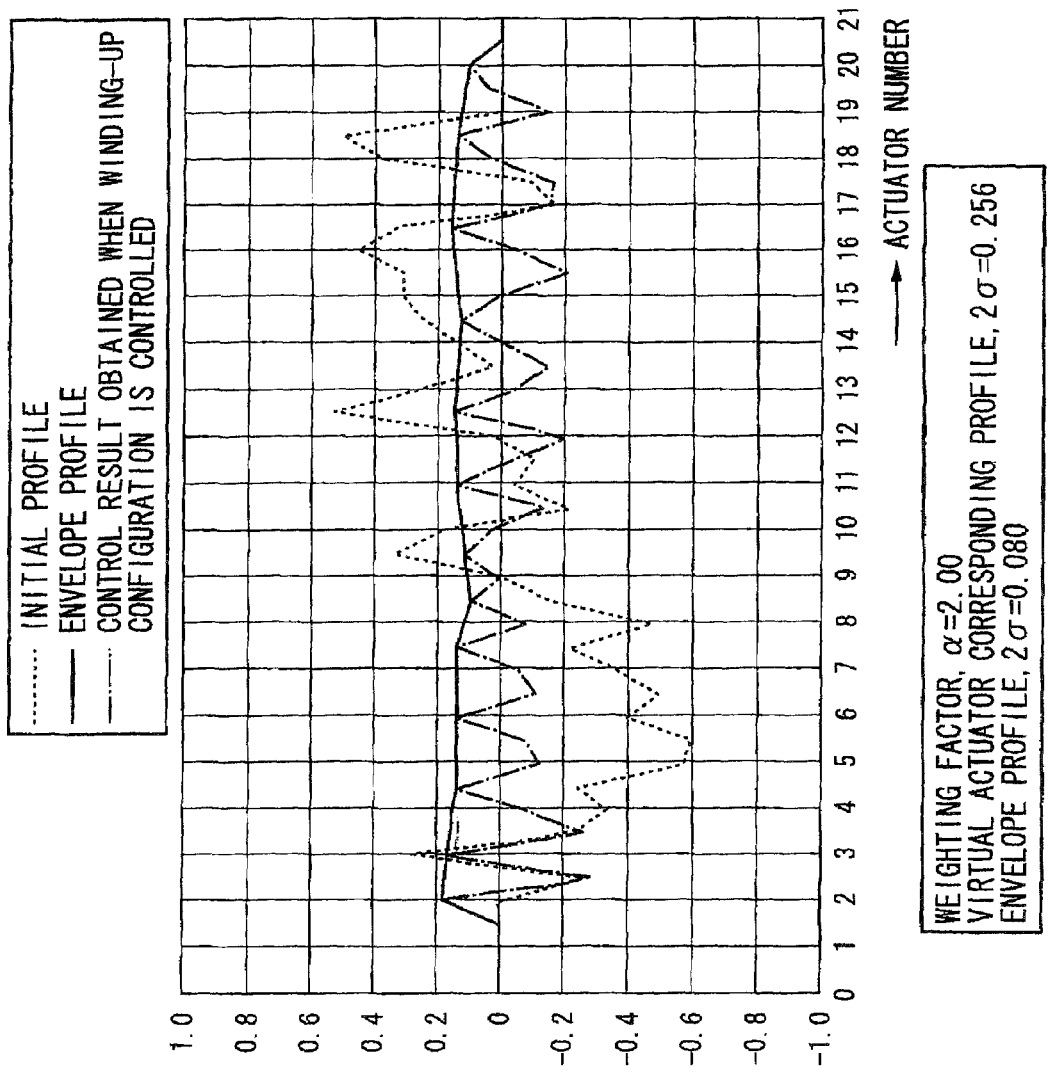
FIG. 6 illustrates the result of a simulation where the profile control in one embodiment of the present invention is carried out.

In this instance, FIG. 5 illustrates the result of a simulation where a profile control by the present embodiment is not carried out, whereas FIG. 6 illustrates the result of the simulation where the profile control by the present embodiment is carried out. Further, FIG. 6 illustrates the result of the simulation where a weighting factor is established to give α=2. As illustrated in FIG. 5, where the profile control by the present embodiment is not carried out, the variation (2σ) of the virtual actuator corresponding profile P(i) is given as 2σ=0.244, and a variation of the envelope profile EP(i) is given as 2σ=0.131. On the other hand, as illustrated in FIG. 6, Where the profile control by the present embodiment is carried out, the variation of the virtual actuator corresponding profile P(i) is slightly deteriorated to give 2σ=0.256, but a variation of the envelope profile EP(i) is given as 2σ=0.080, which is found to be greatly improved as compared with that given in FIG. 5. Then, as apparent from FIG. 5, a maximum prominent peak is found at a position corresponding to a third actuator. However, as apparent in FIG. 6, local peaks are substantially kept equal in height (uniform), indicating that a roll includes a preferable winding shape.

As described so far, unlike the conventional technology where only the virtual actuator corresponding profile P(i) is made uniform, according to the present embodiment, both the virtual actuator corresponding profile P(i) and the envelope profile EP(i) are made uniform, in other words, local peaks on a thickness profile in the width direction of film F are made uniform in height to uniformize the height of projections, thereby making it possible to suppress the occurrence of projections particularly higher than those in the vicinity and consequently provide a roll with a preferable winding shape. Further, unlike the conventional technology, a new calculation of the envelope profile EP(i) alone will reduce the processing load in controlling a profile. Further, the virtual actuator corresponding profile P(i) and the envelope profile EP(i) are calculated based on actually measured data (no model is used unlike the conventional technology), thereby making it possible to obtain a preferable sheet winding shape without an influence of disturbance.

Further, in the above embodiment, a description was given for a film as an example of sheets. The present invention will not be limited thereto but may be applicable to a case where other sheet products such as paper are manufactured. In the above embodiment, the thickness profile is controlled. However, the present invention will not be limited thereto but may be applicable to a case where basis weight, water content, etc., are controlled for profile. Still further, although in the above embodiment, a weighting factor is established to give α=2, the present invention will not be limited thereto but may be modified in various ways, depending on types of sheets and manufacturing conditions. In addition, in the above embodiment, the envelope profile EP(i) which contains a weighting factor a is added to the virtual actuator corresponding profile P(i). However, the present invention will not be limited thereto but may be subjected to profile control so as to optimize only an envelope profile EP(i). In other words, in the formula (17), a term of the virtual actuator corresponding profile P(i) may be deleted to calculate the changed manipulated value ΔX of each of the adjusting bolts 2d.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A system of controlling a profile of thickness in the width direction of a sheet by using a plurality of actuators, comprising:
   a profile controller using a profile of thickness measured in the width direction of the sheet to calculate an envelope profile connecting local peaks of the profile of thickness, thereby calculating a manipulated value of each actuator with the objective of optimizing 2σ of the profile of thickness and the envelope profile,
   wherein the profile controller calculates the manipulated value by applying a steepest descent method relating to an evaluation of optimizing 2σ of the profile of thickness and the envelope profile.

2. The system according to claim 1, wherein the profile controller obtains the evaluation function by adding an evaluation function of the envelope profile containing a predetermined weighting factor to the evaluation function of the profile of thickness, and the profile controller adjusts the weighting factor to adjust an optimization ratio of the profile of thickness the envelope profile.

3. A profile control method for controlling a profile of thickness in the width direction of a sheet by using a plurality of actuators, comprising:
   calculating local peaks of the profile of thickness, based on thickness data of the sheet obtained by a thickness gauge, the calculation of the local peaks being performed by an actuator controller that controls the plurality of actuators,
   calculating, by the actuator controller, an envelope profile connecting local peaks of the profile of thickness; and
   calculating, by the actuator controller, a manipulated value of each actuator with the objective of optimizing 2σ of the profile and the envelope profile,
   wherein the manipulated value is calculated by the actuator controller which applies a steepest descent method relating to an evaluation function of optimizing 2σ of the profile of thickness and the envelope profile.

4. A profile control method according to claim 3, wherein the evaluation function is obtained by adding an evaluation function of the envelope profile containing a predetermined weighting factor to the evaluation function of the profile of thickness, and an optimization ratio of the profile of thickness to the envelope profile is adjusted by adjusting the weighting factor.

* * * * *